US011767419B2

(12) United States Patent
Pujari et al.

(10) Patent No.: US 11,767,419 B2
(45) Date of Patent: Sep. 26, 2023

(54) NON-FOAM POLYOLEFIN COMPOSITIONS FOR WIRE AND CABLE COATING

(71) Applicant: Dow Global Technologies LLC, Midland, MI (US)

(72) Inventors: Saswati Pujari, Collegeville, PA (US); Manish Talreja, Collegeville, PA (US); Mohamed Esseghir, Collegeville, PA (US)

(73) Assignee: Dow Global Technologies, LLC, Midland, MI (US)

( * ) Notice: Subject to any disclaimer, the term of this patent is extended or adjusted under 35 U.S.C. 154(b) by 367 days.

(21) Appl. No.: 17/049,643

(22) PCT Filed: Apr. 11, 2019

(86) PCT No.: PCT/US2019/027001
§ 371 (c)(1),
(2) Date: Oct. 22, 2020

(87) PCT Pub. No.: WO2019/209546
PCT Pub. Date: Oct. 31, 2019

(65) Prior Publication Data
US 2021/0238397 A1    Aug. 5, 2021

Related U.S. Application Data

(60) Provisional application No. 62/663,390, filed on Apr. 27, 2018.

(51) Int. Cl.
| | |
|---|---|
| C08J 3/24 | (2006.01) |
| C08L 23/08 | (2006.01) |
| H01B 3/44 | (2006.01) |
| C08L 23/06 | (2006.01) |
| C08K 3/30 | (2006.01) |
| C08K 5/57 | (2006.01) |
| C08L 23/26 | (2006.01) |
| C08L 51/06 | (2006.01) |

(52) U.S. Cl.
CPC ............... *C08L 23/06* (2013.01); *C08K 3/30* (2013.01); *C08K 5/57* (2013.01); *C08L 23/0815* (2013.01); *C08L 23/26* (2013.01); *C08L 51/06* (2013.01); *H01B 3/441* (2013.01); *C08K 2003/309* (2013.01); *C08L 2203/202* (2013.01); *C08L 2205/02* (2013.01); *C08L 2207/062* (2013.01); *C08L 2207/064* (2013.01); *C08L 2207/066* (2013.01); *C08L 2312/08* (2013.01)

(58) Field of Classification Search
CPC .......... C08L 23/04; C08L 23/06; C08L 23/08; C08L 23/0807; C08L 23/0815; C08L 23/26; C08L 51/00; C08L 51/003; C08L 51/06
See application file for complete search history.

(56) References Cited

U.S. PATENT DOCUMENTS

| | | |
|---|---|---|
| 3,646,155 A | 2/1972 | Scott |
| 4,614,764 A | 9/1986 | Colombo et al. |
| 5,073,598 A | 12/1991 | Anzini |
| 5,246,783 A | 9/1993 | Spenadel et al. |
| 5,266,627 A | 11/1993 | Meverden et al. |
| 5,530,072 A | 6/1996 | Shirodkar |
| 5,589,519 A | 12/1996 | Knaus |
| 5,739,266 A | 4/1998 | Piana |
| 5,795,941 A | 8/1998 | Cree et al. |
| 5,844,009 A | 12/1998 | Hurley et al. |
| 5,869,591 A | 2/1999 | McKay et al. |
| 5,883,144 A | 3/1999 | Bambara et al. |
| 5,977,271 A | 11/1999 | McKay et al. |
| 6,048,935 A | 4/2000 | Penfold et al. |
| 6,316,512 B1 | 11/2001 | Bambara et al. |
| 6,455,637 B1 | 9/2002 | Jackson et al. |
| 6,496,629 B2 | 12/2002 | Ma et al. |
| 6,501,027 B1 | 12/2002 | Belli et al. |
| 6,714,707 B2 | 3/2004 | Rossi et al. |
| 6,723,793 B2 | 4/2004 | Oswald et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 7,892,466 B2 | 2/2011 | Li et al. |
| 9,580,533 B2 | 2/2017 | Jiang et al. |
| 2003/0050401 A1 | 3/2003 | Jackson et al. |
| 2004/0024138 A1 | 2/2004 | Allermann |
| 2008/0277137 A1 | 11/2008 | Timmers et al. |
| 2009/0200059 A1 | 8/2009 | Cinquemani et al. |
| 2010/0227966 A1 | 9/2010 | Jackson et al. |
| 2011/0024934 A1 | 2/2011 | Easter |
| 2013/0319725 A1 | 12/2013 | Timmers et al. |
| 2017/0204237 A1 | 7/2017 | Pujari |
| 2018/0112096 A1* | 4/2018 | Shimada .............. H01B 7/0045 |
| 2019/0348199 A1 | 11/2019 | Wannerskog et al. |
| 2020/0286645 A1 | 9/2020 | Wannerskog et al. |
| 2020/0325314 A1 | 10/2020 | Bergqvist et al. |

FOREIGN PATENT DOCUMENTS

| | | |
|---|---|---|
| AT | 359142 B | 10/1980 |
| EP | 0412518 A2 | 2/1991 |

(Continued)

*Primary Examiner* — Irina S Zemel
*Assistant Examiner* — Jeffrey S Lenihan
(74) *Attorney, Agent, or Firm* — Boyle Fredrickson, S.C.

(57) ABSTRACT

A melt blended composition comprising, in weight percent (wt %) based upon the weight of the composition: (A) 55 to 94.99 wt % of a thermoplastic polymer, (B) 5 to 44.99 wt % of a moisture curable polymer, and (C) 0.01 to 5 wt % of a moisture condensation catalyst exhibits enhanced rheological and mechanical properties as compared to a composition alike in all aspects save for the presence of a moisture curable polymer.

11 Claims, No Drawings

(56) References Cited

FOREIGN PATENT DOCUMENTS

| WO | WO-2015200015 A1 | * | 12/2015 | ............... | C08K 5/13 |
| WO | WO-2016152432 A1 | * | 9/2016 | ............... | C08K 3/22 |

* cited by examiner

NON-FOAM POLYOLEFIN COMPOSITIONS FOR WIRE AND CABLE COATING

FIELD OF THE INVENTION

This invention relates to non-foam wire and cable coating compositions. In one aspect the invention relates to non-foam polyolefin wire and cable coating composition while in another aspect, the invention relates to such compositions comprising a blend of a thermoplastic polymer and a moisture-curable polyolefin.

BACKGROUND OF THE INVENTION

Improving rheological or melt flow properties of polyolefin resins is important for wire and cable applications to meet increasing demand for improved processability for various cable constructions. More specifically, the ability to tailor these properties in a post-reactor step opens the door to a variety of base resins to be used via effective modification. For example, typical narrow molecular weight distribution (MWD) resins exhibit a viscosity profile characterized by lower shear thinning behavior which leads to limited processability and poor surface smoothness at high extrusion line speed. Such resins also exhibit a relatively lower zero shear viscosity compared to their broad MWD counterparts resulting in sagging problems when making thick coating cable constructions.

In addition, high performance solid insulations for electrical signal protection exhibiting higher crush and temperature resistance are needed for applications in twisted-pair category data cables. In these applications, there is a new trend for increased use of low voltage signal to power devices through the data cable itself (Power over Ethernet or PoE), resulting in higher operating temperatures of the cable bundles. There is concern about the long term ability of foamed insulation to withstand compressive stresses as the cable temperature rises driven by possible material softening. Solid or non-foam insulations may deliver a better solution for this application. For example, higher melting point polymers could be modified for high melt strength, high speed extrusion and flexibility via judicious blending of a modifiable component for flexibility while retaining a high temperature resistance. For these reasons and others, there is a desire for new and effective methods to tailor the viscosity and temperature properties of polyolefins to meet various applications and manufacturing conditions.

SUMMARY OF THE INVENTION

In one embodiment the invention is a melt blended composition comprising, in weight percent (wt %) based upon the weight of the composition:
(A) 55 to 94.99 wt % of a thermoplastic polymer,
(B) 5 to 44.99 wt % of a moisture curable polymer, and
(C) 0.01 to 5 wt % of a moisture condensation catalyst.

In one embodiment the composition is prepared by a process in which the thermoplastic polymer and moisture-curable polyolefin are melt-blended with a moisture condensation catalyst. In one embodiment the resulting melt-blended composition is then subjected to a moisture cure step.

DETAILED DESCRIPTION OF THE PREFERRED EMBODIMENT

Definitions

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 to 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percents are based on weight and all test methods are current as of the filing date of this disclosure.

"Wire" and like terms mean a single strand of conductive metal, e.g., copper or aluminum, or a single strand of optical fiber.

"Cable" and like terms mean at least one wire or optical fiber within a protective insulation, jacket or sheath. Typically, a cable is two or more wires and/or optical fibers bound together, typically in a common protective insulation, jacket or sheath. The individual wires or fibers inside the jacket may be bare, covered or insulated. Combination cables may contain both electrical wires and optical fibers. The cable, etc. can be designed for any voltage application, e.g., low, medium, high, ultra-high, etc. Typical cable designs are illustrated in U.S. Pat. Nos. 5,246,783; 6,496,629 and 6,714,707.

"Polymer" means a compound prepared by reacting (i.e., polymerizing) monomers, whether of same or different. The generic term polymer thus embraces the term "homopolymer", usually employed to refer to polymers prepared from only one type of monomer, and the term "interpolymer" as defined below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Olefin" and like terms mean hydrocarbons (compounds containing hydrogen (H) and carbon (C)) whose molecules contain a pair of carbon atoms linked together by a double bond.

"Polyolefin" and like terms mean a class of polymers produced from a simple olefin (also called an alkene with the general formula CnH2n) as a monomer. For example, polyethylene is the polyolefin produced by polymerizing the olefin ethylene. Polypropylene is the polyolefin produced by polymerizing the olefin propylene.

"Polyethylene", "ethylene polymer" and like terms mean a polymer containing units derived from ethylene. Ethylene polymers typically comprise at least 50 mole percent (mol %) units derived from ethylene.

"Silane-functionalized polyolefin" and like terms mean an olefin polymer comprising silane functionality. The silane functionality is the result of either grafting hydrolysable unsaturated silane, e.g., a vinyl trialkoxy silane, onto an olefin, e.g., ethylene, polymer backbone as described, for example, in U.S. Pat. No. 3,646,155 or 6,048,935, or the copolymerization of a hydrolysable unsaturated silane with an olefin of which SI-LINK™ DFDA-5451, a copolymer of ethylene and vinyl trimethoxy silane and available from DowDuPont, is an example.

"Blend," "polymer blend" and like terms mean a combination of two or more polymers. Such a blend may or may not be miscible. Such a combination may or may not be phase separated. Such a combination may or may not contain one or more domain configurations, as determined from transmission electron spectroscopy, light scattering, x-ray scattering, and any other method known in the art.

"Composition" and like terms mean a mixture or blend of two or more components. For example, in the context of preparing a silane-grafted ethylene polymer, a composition would include at least one ethylene polymer, at least one vinyl silane, and at least one free radical initiator. In the context of preparing a cable sheath or other article of manufacture, a composition would include an ethylene-vinylsilane copolymer, a catalyst cure system and any desired additives such as lubricants, fillers, anti-oxidants and the like.

"Ambient conditions" and like terms mean temperature, pressure and humidity of the surrounding area or environment of an article. The ambient conditions of a typical office building or laboratory include a temperature of 23° C. and atmospheric pressure.

"Grafting conditions" and like terms mean temperature, pressure, humidity, residence time, agitation, etc., at which a hydrolysable unsaturated silane will graft, i.e., add to or combine with, a polyolefin when the two are contacted with one another. Grafting conditions can vary with the nature of the silane and polyolefin, and the presence or absence of a catalyst.

"Catalytic amount" means an amount of catalyst necessary to promote a reaction, e.g., the grafting of a silane compound to a polyolefin, or the crosslinking of an ethylene-vinylsilane polymer, etc., at a detectable level, preferably at a commercially acceptable level.

"Crosslinked", "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content). The phase of the process during which the crosslinks are created is commonly referred to as the "cure phase" and the process itself is commonly referred to as "curing".

"Crosslinkable", "curable" and like terms means that the polymer, before or after shaped into an article, is not cured or crosslinked and has not been subjected or exposed to treatment that has induced substantial crosslinking although the polymer comprises additive(s) or functionality which will cause or promote substantial crosslinking upon subjection or exposure to such treatment (e.g., exposure to water).

"Thermoplastic polymer" and like terms mean a linear or branched polymer that can be repeatedly softened and made flowable when heated and returned to a hard state when cooled to room temperature. In the context of this invention, the thermoplastic polymer generally has an elastic modulus greater than 10,000 psi (68.95 MPa) using the method of ASTM D638-72. In addition, thermoplastic polymers can be molded or extruded into articles of any predetermined shape when heated to the softened state.

"Thermoset polymer", "thermosetting polymers" and like terms mean that once cured, the polymer cannot be softened, i.e., further shaped, by heat. Thermosetting polymers, once cured, are space network polymers and are highly crosslinked to form rigid three-dimensional molecular structures.

"Pellet" and like terms mean small particles typically created by compressing a powder or granular material, or by chopping strands created during extrusion of a melt through a die. Pellet shapes and sizes can vary widely.

"Moisture-curable polymer" and like terms mean a polymer that can be crosslinked upon exposure to moisture. The amount or degree of crosslinking will depend upon, among other things, (1) the curing conditions, e.g., temperature, amount and form of water (bath, mist, etc.), residence time, presence or absence of catalyst and if present, the kind and amount of catalyst, etc., and (2) the moisture-curable polymer itself. In the context of a polyolefin polymer comprising a hydrolyzable silane group, the silane group is first hydrolyzed upon exposure to water in which the hydrolyzable silane group is converted to a silanol group and an alcohol is formed as a by-product. The silanol groups are then crosslinked through a condensation reaction. Typically both the first and second steps are catalyzed with a condensation catalyst.

"Melt blending" is a process in which at least two components are combined or otherwise mixed together, and at least one of the components is in a melted state. The melt blending may be accomplished by one or more of various know processes, e.g., batch mixing, extrusion blending, extrusion molding, and the like. "Melt blended" compositions are compositions which were formed through the process of melt blending.

"Coating" and like terms mean the application in any manner, e.g., contacting, depositing, "salting out", precipitating, etc., of one material, i.e., the applied material, to another material, i.e., the base material, such that the applied and base materials adhere to one another. "Coating" also refers to the applied material that has been contacted, or deposited, etc., to the base material. In the context of wire and cable, the coating is typically a polymer that has been extruded over and in contact with a wire or previously coated wire or cable, such as a semiconductor layer, or an insulation layer, or an outer protective jacket.

"Foam" and like terms mean a solid or liquid with many trapped gas bubbles. In the context of this invention, the gas bubbles trapped in the solid or liquid are typically generated through the use of a foaming agent. "Non-foam" and like terms mean a solid or liquid without any significant amount of trapped gas bubbles. In the context of this invention, a non-foam is produced in the absence of a foaming agent or if a foaming agent is present, then it (i.e., the foaming agent) is not active. In the context of this invention, "non-foam" and "solid" are used synonymously.

Thermoplastic Polymer

Any polymer that will soften upon heating is a thermoplastic polymer that can be used in the practice of this invention. Such polymers include polyolefins, polyesters, polyamides, polyvinyl chloride (PVC), polystyrene, polytetrafluoroethylene (PTFE), and the like.

In one embodiment the thermoplastic polymer is a polyolefin. The polyolefin resins useful in the practice of this invention include both polyolefin homopolymers and interpolymers. Examples of polyolefin homopolymers are the homopolymers of ethylene and propylene. Examples of the polyolefin interpolymers are the ethylene/alpha-olefin interpolymers and the propylene/alpha-olefin interpolymers. The alpha-olefin is preferably a C3-20 linear, branched or cyclic alpha-olefin (for the propylene/alpha-olefin interpolymers, ethylene is considered an alpha-olefin). Examples of C3-20 alpha-olefins include propene, 1-butene, 4-methyl-1-pentene, 1-hexene, 1-octene, 1-decene, 1-dodecene, 1-tetradecene, 1-hexadecene, and 1-octadecene. The alpha-olefins can also contain a cyclic structure such as cyclohexane or cyclopentane, resulting in an alpha-olefin such as 3-cyclohexyl-1-propene (allyl cyclohexane) and vinyl cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (for example, alpha-methylstyrene, etc.) are alpha-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethyl ene/butene/1-octene, and ethylene/butene/styrene. The copolymers can be random or blocky.

The polyolefin resins can also comprise one or more functional groups such as halogen, and/or an unsaturated ester or acid, and these polyolefins are well known and can be prepared by conventional high-pressure techniques. Chlorine is a typical halogen (e.g., PVC), and the unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

Examples of ethylenic polymers useful in the practice of this invention include high density polyethylene (HDPE); medium density polyethylene (MDPE); low density polyethylene (LDPE); very low density polyethylene (VLDPE), e.g., FLEXOMER™ ethylene/1-hexene polyethylene by The Dow Chemical Company); homogeneously branched, linear ethylene/alpha-olefin copolymers (e.g. TAFMER™ by Mitsui Petrochemicals Company Limited and EXACT™ by DEX-Plastomers); homogeneously branched, substantially linear ethylene/alpha-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are more fully described in U.S. Pat. Nos. 5,272,236; 5,278,272 and 5,986,028, and the ethylene block copolymers are more fully described in U.S. Pat. Nos. 7,579,408; 7,355,089; 7,524,911; 7,514,517; 7,582,716 and 7,504,347.

Olefinic interpolymers of particular interest for use in the practice of this invention are LDPE, linear low density polyethylene (LLDPE) and HDPE. These ethylenic copolymers are commercially available from a number of difference sources including The Dow Chemical Company under such trademarks as DOWLEX™, ATTANE™ and FLEXOMER™; Equistar/LyondellBasell under such trademarks as PETROTHENE™, Nova Chemical Company under such trademarks as NOVAPOL™, and SCLAIR™; and ExxonMobil Chemical Company under such trademarks as EXCEED™, EXACT™ and ENABLE™.

The polyolefins useful in the practice of this invention also include propylene, butene and other alkene-based copolymers, e.g., copolymers comprising a majority of units derived from propylene and a minority of units derived from another alpha-olefin (including ethylene). Exemplary propylene polymers useful in the practice of this invention include the VERSIFY™ polymers available from The Dow Chemical Company, and the VISTAMAXX™ polymers available from ExxonMobil Chemical Company.

The thermoplastic polymers, particularly the thermoplastic polyolefin polymers, typically have a density of 0.856, or 0.865, or 0.870, to 0.975, or 0.950, or 0.920, grams per cubic centimeter (g/cm$^3$). Density is measured by the procedure of ASTM D-792.

The thermoplastic polymers, particularly the thermoplastic olefin polymers, typically have a melt index 0.01, or 0.1, or 0.5, to 1,000, or 100, or 10, or 1.0, grams per 10 minutes (g/10 min). Melt index for ethylene-based polymers is measured by the procedure of ASTM D-1238 (190° C./2.16 kg) and for propylene-based polymers by the procedure of ASTM D-1238 (230° C./2.16 kg).

Blends of any of the above olefinic polymers can also be used in this invention, and the olefin polymers can be blended or diluted with one or more other thermoplastic polymers to the extent that, in a preferred mode, the olefin polymers of this invention constitute at least about 50, preferably at least about 75 and more preferably at least about 80, weight percent of the thermoplastic polymer component of the blend. In a less preferred mode and depending on other properties that may be sought, the olefin polymer content may be less than 50% of the thermoplastic polymer component. In one embodiment the thermoplastic polymer is void or free of any olefinic polymer.

The amount of thermoplastic polymer in the composition of this invention, i.e., in the melt blend of a thermoplastic polymer, a moisture-curable polyolefin, and a moisture condensation catalyst, is typically at least 55, or 60, or 70, weight percent (wt %) based on the total weight of the composition. The maximum amount of thermoplastic polymer in the composition typically does not exceed 94.99, or 90, or 85, or 80, wt % based on the weight of the composition.

Moisture Curable Polyolefin

The moisture curable polyolefin used in the practice of this invention is a polyolefin with silane functionality. The silane functionality can be introduced into or onto the polyolefin through copolymerization and/or grafting.

Any silane that will effectively copolymerize with an olefin, e.g., ethylene, or graft to and crosslink an olefin polymer, can be used in the practice of this invention, and those described by the following formula are exemplary:

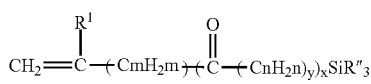

in which $R_1$ is a hydrogen atom or methyl group; x and y are 0 or 1 with the proviso that when x is 1, y is 1; m and n are independently an integer from 0 to 12 inclusive, preferably 0 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such silanes may be copolymerized with the olefin in a reactor, such as a high pressure process. Such silanes may also be grafted to a suitable olefin polymer by the use of a suitable quantity of organic peroxide, either before or during a shaping or molding operation. Additional ingredients such as heat and light stabilizers, pigments, etc., also may be included in the formulation. Also included are silanes that add to unsaturation in the polymer via free radical processes such as mercaptopropyl trialkoxysilane.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, propriony-loxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred source of the silane functionality of the moisture curable polymers used in the practice of this invention.

The amount of silane functionality in the moisture curable can vary widely depending upon the nature of the polymer, the silane, the processing or reactor conditions, the grafting or copolymerization efficiency, the ultimate application, and similar factors, but typically the polymer contains at least 0.5, preferably at least 0.7, weight percent. Considerations of convenience and economy are two of the principal limitations on the maximum amount of silane functionality in the moisture curable polymer, and typically the maximum amount of such functionality does not exceed 5, preferably it does not exceed 3, weight percent.

The silane is grafted to the polymer by any conventional method, typically in the presence of a free radical initiator, e.g. a peroxide or azo compound, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy) hexane, lauryl peroxide, and tert-butyl peracetate. A suitable azo compound is 2,2-azobisisobutyronitrile. The amount of initiator can vary, but it is typically present in an amount of at least 0.01, preferably at least 0.03, parts per hundred resin (phr). Typically, the initiator does not exceed 0.15, preferably it does not exceed about 0.10, phr. The weight ratio of silane compound to initiator also can vary widely, but the typical silane:initiator weight ratio is between 10:1 to 500:1, preferably between 18:1 and 250:1. As used in parts per hundred resin or phr, "resin" means the olefinic polymer.

While any conventional method can be used to graft the silane to the polyolefin polymer, one preferred method is blending the two with the initiator in the first stage of a reactor extruder, such as a BUSS™ kneader. The grafting conditions can vary, but the melt temperatures are typically between 160 and 260° C., preferably between 190 and 230° C., depending upon the residence time and the half-life of the initiator.

Copolymerization of vinyl trialkoxysilane with the olefin and other monomers may be done in a high-pressure reactor that is used in the manufacture of olefin homopolymers and copolymers with vinyl acetate and acrylates.

The amount of moisture curable polymer in the composition of this invention, i.e., in the melt blend of a thermoplastic polymer, a moisture-curable polyolefin, and a moisture condensation catalyst, is typically at least 5, or 10, weight percent (wt %) based on the total weight of the composition. The maximum amount of moisture curable polymer in the composition typically does not exceed 44.99, or 40, or 35, or 30, or 25, wt % based on the weight of the composition.

The olefin polymers, particularly the silane containing ethylene polymers, have, a density of 0.856, or 0.870, or 0.900, to 0.925, or 0.950, or 0.975, grams per cubic centimeter (g/cm$^3$). Density is measured by the procedure of ASTM D-792. These, e.g., vinyl-trimethoxysilane, contain 0.25, or 0.75, or 1.25 to 1.57, or 2.25 or 3% silane by weight.

The olefin polymers, particularly the ethylene polymers, typically have a melt index 0.01, or 0.1, or 0.5, to 1,000, or 100, or 10, or 1.0 grams per 10 minutes (g/10 min). Melt index for ethylene-based polymers is measured by the procedure of ASTM D-1238 (190° C./2.16 kg) and for propylene-based polymers by the procedure of ASTM D-1238 (230° C./2.16 kg).

In one embodiment the melt index of the thermoplastic polymer is less than the melt index of the moisture curable polymer. In one embodiment the melt index of the thermoplastic polymer is less than 90, or 80, or 70, or 60, or 50, or 40, or 30, or 20, or 10, percent of the melt index of the moisture curable polymer. This difference in melt index between the two polymers facilitates good mixing of the two polymers.

Moisture Condensation Catalyst

Moisture condensation catalysts, or simply crosslinking catalysts, include the Lewis and Brönsted acids and bases. Lewis acids are chemical species that can accept an electron pair from a Lewis base. Lewis bases are chemical species that can donate an electron pair to a Lewis acid. Lewis acids that can be used in the practice of this invention include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. DBTDL is a preferred Lewis acid. Lewis bases that can be used in the practice of this invention include, but are not limited to, the primary, secondary and tertiary amines.

The minimum amount of crosslinking catalyst used in the practice of this invention is a catalytic amount. Typically this amount is at least 0.01, preferably at least 0.02 and more preferably at least 0.03, weight percent (wt %) of the combined weight of silane-functionalized polyolefin and catalyst. The only limit on the maximum amount of cross-linking catalyst in the composition is that imposed by economics and practicality (e.g., diminishing returns), but typically a general maximum comprises less than 5, preferably less than 3 and more preferably less than 2, wt % of the combined weight of moisture curable polymer and catalyst.

The silane crosslinking catalyst is typically added to the thermoplastic polymer and/or moisture curable polymer in the form of a masterbatch but whatever the mode of its addition to the other polymers of the inventive composition, it is present during the melt blending of the thermoplastic polymer and moisture curable polymer. This melt blending is conducted using standard techniques and equipment, e.g., internal batch mixers, reaction-extruders, etc.

Fillers and Additives

The compositions of this invention can comprise one or more filler and/or additive. The amount of filler present should preferably not exceed an amount that would cause unacceptably large degradation of the mechanical and/or chemical properties of the moisture cured composition. Typically, the amount of filler present is between 2 and 35, preferably between 5 and 20, weight percent (wt %) based on the weight of the composition. Representative fillers include kaolin clay, magnesium hydroxide, silica, calcium carbonate and carbon blacks. The filler may or may not have flame retardant properties. In a preferred embodiment of this invention in which filler is present, the filler is coated with a material that will prevent or retard any tendency that the filler might otherwise have to interfere with the silane cure reaction. Stearic acid is illustrative of such a filler coating. Filler and catalyst are selected to avoid any undesired interactions and reactions, and this selection is well within the skill of the ordinary artisan.

The compositions of this invention can also contain additives such as, for example, antioxidants (e.g., hindered phenols such as, for example, IRGANOX™ 1010 available from Ciba Specialty Chemicals), phosphites (e.g., IRGAFOS™ 168 available from Ciba Specialty Chemicals), UV stabilizers, cling additives, light stabilizers (such as hindered amines), plasticizers (such as dioctylphthalate or epoxidized soy bean oil), metal deactivators, scorch inhibitors, mold release agents, tackifiers (such as hydrocarbon tackifiers), waxes (such as polyethylene waxes), nucleating agents (such as HYPERFORM™ HPN-20E available from Milliken Chemicals, and PTFE from DowDuPont), processing aids (such as oils, organic acids such as stearic acid, metal salts of organic acids), oil extenders (such as paraffin oil and mineral oil), colorants or pigments to the extent that they do not interfere with desired physical or mechanical properties of the compositions of the present invention. These additives are used in amounts known to those versed in the art.

Compounding and Fabrication

Compounding of the thermoplastic polymer, moisture curable polymer, condensation catalyst, and optional filler and additives can be performed by standard means known to those skilled in the art. Examples of compounding equipment are internal batch mixers, such as a BANBURY™ or BOLLING™ internal mixer. Alternatively, continuous single or twin screw mixer or extruders can be used, such as a FARREL™ continuous mixer, a WERNER AND PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

The components of the composition are typically mixed at a temperature and for a length of time sufficient to fully homogenize the mixture but insufficient to cause the material to gel. The catalyst is typically added to the silane-grafted olefin polymer but it can be added before, with or after the additives, if any. Typically, the components are mixed together in a melt-mixing device. The mixture is then shaped into the final article. The temperature of compounding and article fabrication should be above the melting point of the silane-grafted olefin polymer but below 250° C.

In some embodiments, either or both of the catalyst and the additives are added as a pre-mixed masterbatch. Such masterbatches are commonly formed by dispersing the catalyst and/or additives into an inert plastic resin, e.g., a low density polyethylene. Masterbatches are conveniently formed by melt compounding methods.

In one embodiment, one or more of the components are dried before compounding, or a mixture of components is dried after compounding, to reduce or eliminate potential scorch that may be caused from moisture present in or associated with the component, e.g., filler.

Articles of Manufacture

In one embodiment, the composition of this invention can be applied to a cable as a protective jacket or insulation layer in known amounts and by known methods (for example, with the equipment and methods described in U.S. Pat. Nos. 5,246,783 and 4,144,202). Typically, the composition is prepared in a reactor-extruder equipped with a cable-coating die and after the components of the composition are formulated, the composition is extruded over the cable as the cable is drawn through the die. Cure may begin in the reactor-extruder.

While not necessary or preferred, the shaped article can be exposed to either or both elevated temperature and external moisture and if an elevated temperature, it is typically between ambient and up to but below the melting point of the polymer for a period of time such that the article reaches a desired degree of crosslinking. The temperature of any post-shaping cure should be above 0° C.

Other articles of manufacture that can be prepared from the polymer compositions of this invention include fibers, ribbons, sheets, tapes, tubes, pipes, weather-stripping, seals, gaskets, hoses, foams, footwear and bellows. These articles can be manufactured using known equipment and techniques.

The invention is described more fully through the following examples. Unless otherwise noted, all parts and percentages are by weight.

EXAMPLES

Test Methods

Samples that are measured for density are prepared according to ASTM D 1928. Samples are pressed at 374° F. (190° C.) and 30,000 psi for 3 minutes, and then at 70° F. (21° C.) and 30,000 psi for 1 minute. Density measurements are made within one hour of sample pressing using ASTM D792, Method B.

Melt index, or I2, is measured for ethylene-based polymers according to ASTM D 1238, Condition 190° C./2.16 kg, and is reported in grams eluted per 10 minutes (g/10 min). Melt flow rate, or MFR, is measured for propylene-based polymers according to ASTM D 1238, Condition 230° C./2.16 kg, and is reported in g/10 min.

Tensile and elongation were measured according to ISO 527-2, test specimen type 5A.

Dynamic Oscillatory Shear (DOS) Rheology (frequency sweep 100-0.1 rad/s) was measured on the comparative examples at 190° C. (on plaques molded from pellets of unmodified base resin and peroxide-treated polymer material not containing any foaming agent), and on the inventive examples on plaques molded from pellets after the cure step and from material not containing any foaming agent.

Wire smoothness test: The surface smoothness of a conductor jacket is measured according to ANSI 1995 via a SURFTEST™ SV-400 Series 178 Surface Texture Measuring Instrument. A wire sample is placed in a V-Block and the stylus (10 urn) is lowered down to a specific start position (about 1 gram force is applied to wire). At a fixed rate of 2 millimeters per second the stylus is moved in the transverse direction taking measurements. Four readings per wire sample and four samples are tested which are then averaged with values reported in micron-inch.

Materials

DFH 2065 is a linear low density polyethylene (LLDPE) in granular form with a density of 0.920 g/cm$^3$ and a melt index of 0.65 g/10 min (190° C./2.16 kg).

DFNA-4580 is a high density polyethylene (HDPE) with a density of 0.945 g/cm$^3$ and a melt index of 0.8 g/10 min available from The Dow Chemical Company.

DOWLEX™ GM 8480F is an LLDPE with a density of 0.917 g/cm$^3$ and a melt index of 3 g/10 min (190° C./2.16 kg) available from The Dow Chemical Company.

SI-LINK™ DFDA-5451 is a copolymer of ethylene and 1.5% vinyl trimethoxy silane (VTMS) with a density of 0.922 g/cc and a melt index (MI) of 1.5 g/10 min, available from The Dow Chemical Company.

SI-LINK™ DFDB-5480 NT catalyst masterbatch contains low density polyethylene (0.925 g/cc, MI of 3.0 g/10 min) plus 1.7 wt % dibutyl tin dilaurate.

AXELERON™ GP A-0037 BK CPD carbon black masterbatch with a density of 1.18 g/cc and contains an LLDPE and 45 wt % carbon black. The masterbatch is available from DowDuPont.

SYNOX™ TBM6 (4,4'-thiobis(2-t-butyl-5-methylphenol) is an antioxidant and light stabilizer available from Synchemer Co.

DYNAMAR™ FX 5912 is a polymer processing additive commercially available from 3M Co.

Procedure

The compositions are compounded in a BRABENDER™ batch mixer at 150° C. The condensation catalyst (dibutyltin, SI-LINK™ DFDB-5480 NT) is dried before blending. After compounding, the composition is extruded from a BRABENDER™ ¾ inch diameter, 25:1 L/D extruder operated at 50 revolutions per minute (rpm) and a take-up speed of 38 feet per minute. The temperature profile of the extruder is 210° C. across all five zones. The extruded strand is cut into pellets [size?] and either cured in a 90° C. water bath for 4 hours and then dried in a convection oven overnight at 80° C., or cured in a humidity chamber at 50° C. and 75% relative humidity for 14 days and then dried overnight at 80° C. The cured and dried pellets are then melted pressed into 4 inch by 4 inch 75 mil plaques for tensile and elongation testing (speed of 20 inches per minute). The dynamic oscillatory shear testing was conducted at 190° C. and a frequency sweep of 100-0.1 radians per second. The formulations and test results are reported in the following Table.

TABLE

| Description | Example Density | CE-1 XL SI-LINK | CE-2 Control | CE-3 | CE-4 Pre-XL | CE-5 No cat | IE-1 | IE-2 | IE-3 |
|---|---|---|---|---|---|---|---|---|---|
| DFH 2065 (LLDPE 0.920 den, 0.65 MI) | 0.920 | | 94.21 | | | | | | |
| DFNA-4580 (HDPE, 0.945 den, 0.8 MI) | 0.945 | | | | | | | | |
| DOWLEX GM 8480F (0.917 den, 3.0 MI) | 0.917 | | | 94.21 | 74.21 | 84.21 | 79.21 | 69.21 | 59.21 |
| XL-SILINK | | | | | 20 | | | | |
| DFDA-5451 (Si-LINK VTMS copolymer) | 0.920 | 95 | | | | 10 | 10 | 20 | 30 |
| DFDB-5480 (Dibutyltin catalyst MB) | 0.920 | 5 | | | | | 5 | 5 | 5 |
| BI 0340 (49% Azodicarbonamide MB) | | | | | | | | | |
| A-0037 BK Carbon Black MB | | | 5.67 | 5.67 | 5.67 | 5.67 | 5.67 | 5.67 | 5.67 |
| SYNOX TBM6 | | | 0.1 | 0.1 | 0.1 | 0.1 | 0.1 | 0.1 | 0.1 |
| DYNAMAR FX 5912 processing aid | | | 0.02 | 0.02 | 0.02 | 0.02 | 0.02 | 0.02 | 0.02 |
| Total | | | 100 | 100 | 100 | 100 | 100 | 100 | 100 |
| Cure? | | Yes, see Note 2a | No | No | No | No | Yes, see Note 2b | Yes, see Note 2b | Yes, see Note 2b |
| Foam Density (gr/cc) | | | | | | | | | |
| T&E (ISO 5A dogbone) | | | | | | | | | |
| Tensile Strength @ Peak, psi | | | 1927 | 4068 | 1770 | 4057 | 3316 | 3021 | 2568 |
| STD on TS | | | 47 | 151 | 44 | 137 | 135 | 79 | 253 |
| Tensile Elong @ Break, % | | | 752 | 894 | 334 | 888 | 781 | 639 | 499 |
| STD on % Elong. | | | 64 | 23 | 84 | 16 | 28 | 26 | 51 |

TABLE-continued

Compound Formulations and Testing Results

| Description | Example Density | CE-1 XL SI-LINK | CE-2 Control | CE-3 | CE-4 Pre-XL | CE-5 No cat | IE-1 | IE-2 | IE-3 |
|---|---|---|---|---|---|---|---|---|---|
| Oscillatory Shear Viscosity @ 190 C. | | | | | | | | | |
| V100 (Pa-sec) | | | 6.81E+02 | 9.09E+02 | 1.32E+03 | 9.10E+02 | 7.92E+02 | 9.78E+02 | 9.15E+02 |
| V0.1 (Pa-sec) | | | 1.34E+04 | 2.79E+03 | 1.14E+04 | 3.06E+03 | 1.01E+04 | 8.35E+04 | 1.69E+05 |
| Ratio V0.1/V100 | | | 19.7 | 3.1 | 8.6 | 3.4 | 12.8 | 85.4 | 184.7 |
| Jacket Surface Smoothness | | | | | | | | | |
| Surface Smoothness (µ-in) | | | 26.0 | 141.3 | 489.9 | 344.4 | 154.8 | 95.1 | 223.5 |
| STD Surface Smoothness (µ-in) | | | 15.3 | 41.2 | 167.8 | 93.0 | 65.9 | 14.1 | 49.2 |

Note 2a:
Cure pelleted material in 90 C. water bath for 4 hours (formulation 1 XL SI-LINK only), Dry in convection overnight at 80 C. before use.
Note 2b:
Cure pelleted material in humidity chamber (50 C. and 75% RH) for 14 days before extrusion Results and Discussion CE-1 is a fully cross-linked system, representing a typical moisture-cured silane copolymer. The material was pelletized after compounding then cured as per Note 2a. This compound was prepared for use in CE-4 and is not extrudable by itself since it is not thermoplastic.

CE-2 is a thermoplastic compound using a broad MWD Gas Phase LLDPE resin. The compound shows good mechanical properties and excellent surface smoothness of extruded jacket.

CE-3 is a thermoplastic compound using a narrow MWD (nMWD) Solution LLDPE resin. The compound shows superior mechanical properties compared to CE-2, however the surface smoothness of the extruded jacket is clearly inferior as shown by both the roughness value and the broader STD.

CE-4 is a blend of the nMWD LLDPE and 20% wt. of the pre-cured silane copolymer. This example shows significantly higher V0.1/V100 ratio compared to the base system, however; it resulted in a highly inhomogeneous extrudate with very rough surface and poor mechanical properties as shown by the tensile and elongation (T&E) data. This comparative example demonstrates the importance of first mixing all components in a thermoplastic fashion in the presence of the catalyst then subjecting the compound to a crosslinking step prior to final article manufacture.

CE-5 is a thermoplastic blend of the nMWD LLDPE and 10% wt. of the silane copolymer in the absence of the moisture condensation catalyst. This example shows the effect of adding the LDPE component without the modification proposed by this invention. The results show that at this level of LDPE addition, there is insignificant change in rheology as shown by the V0.1 and V100 values as well as the V0.1/V100 ratio, also equivalent T&E and actually a deterioration in surface smoothness vs. CE-3.

IE-1 is a thermoplastic blend of the nMWD LLDPE and 10% wt. of the silane copolymer in the presence of the moisture condensation catalyst. The results should be compared to CE-5 and demonstrate this invention as they show a marked improvement in the zero shear viscosity (V0.1 higher with a slight reduction in V100) resulting in a significant increase in the V0.1/V100 ratio. The T&E performance is acceptable and at this modification level, although the surface smoothness is improved vs. CE-5 (no catalyst), it is still not improved vs. the unmodified base resin case CE-5.

IE-2 is a thermoplastic blend of the nMWD LLDPE and 20% of the silane copolymer compounded in the presence of the catalyst and subject to a moisture cure step prior to extrusion. This inventive example should be compared to CE-3 (base LLDPE) and CE-4 which uses pre-crosslinked silane copolymer at the same concentration level. Compared to both CE-3 and CE-5, this inventive example shows acceptable mechanical properties, an increase in the V0.1/V100 ratio, as well as marked improvement in surface smoothness.

IE-3 is a thermoplastic blend of the nMWD LLDPE and 30% of the silane copolymer compounded in the presence of the catalyst and subject to a moisture cure step prior to extrusion. Compared to CE-3 (base LLDPE), this example shows significant increase in the V0.1/V100 ratio, but lower mechanical properties and inferior surface smoothness, possibly indicating the limits of the preferred range for the amount of the curable phase for optimum properties.

What is claimed is:

1. A melt blended composition comprising, in weight percent (wt %) based upon the weight of the composition: a non-foam composition comprising
    (A) 55 to 94.99 wt % of a thermoplastic polymer that is one or more non-functionalized polyethylenes, each polyethylene comprising at least 50 mol % units derived from ethylene,
    (B) 5 to 44.99 wt % of a silane functionalized polyethylene,
    (C) 0.01 to 5 wt % of a moisture condensation catalyst,
    (D) optional carbon black,
    (E) optional additive selected from the group consisting of antioxidant, light stabilizer, UV stabilizer, cling additive, processing aid, and combinations thereof, and
    components (A), (B), (C), (D), and (E) amount to 100 wt % of the composition.
2. The composition of claim 1 in which the condensation catalyst is a Lewis acid or a Lewis base.
3. The composition of claim 1 in which the condensation catalyst is dibutyl tin dilaurate.
4. The composition of claim 1 in which the condensation catalyst is sulfonic acid.
5. A crosslinked composition of claim 1.
6. A wire or cable sheath comprising the composition of claim 1.
7. A wire or cable comprising the sheath of claim 6.

8. The composition of claim 1 wherein the thermoplastic polymer comprises two polyethylenes, each polyethylene different than the other.

9. The composition of claim 8 wherein the carbon black (D) is present.

10. The composition of claim 9 wherein the thermoplastic polymer comprises three polyethylenes, each polyethylene different than the other.

11. The composition of claim 10 wherein the additive (E) is present and the additive includes an antioxidant, a light stabilizer, and a processing aid.

\* \* \* \* \*